(12) United States Patent
Mednik

(10) Patent No.: US 10,778,080 B1
(45) Date of Patent: Sep. 15, 2020

(54) SELF-BIASED NON-ISOLATED LOW-POWER SWITCHING REGULATOR

(71) Applicant: Microchip Technology Incorporated, Chandler, AZ (US)

(72) Inventor: Alexander Mednik, Campbell, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/657,301

(22) Filed: Oct. 18, 2019

Related U.S. Application Data

(60) Provisional application No. 62/858,113, filed on Jun. 6, 2019.

(51) Int. Cl.
*H02M 1/00* (2006.01)
*H02M 1/08* (2006.01)
*H02M 7/217* (2006.01)
*H02M 1/32* (2007.01)

(52) U.S. Cl.
CPC .............. *H02M 1/08* (2013.01); *H02M 1/32* (2013.01); *H02M 7/217* (2013.01); *H02M 2001/0048* (2013.01)

(58) Field of Classification Search
CPC .......... H02M 1/08; H02M 1/32; H02M 7/217; H02M 2001/0048; H02M 3/07; H02M 3/158
See application file for complete search history.

(56) References Cited

U.S. PATENT DOCUMENTS

| 2003/0223159 A1* | 12/2003 | Jenkins | H02M 3/158 361/18 |
| 2020/0044578 A1* | 2/2020 | Mangudi | H02M 3/158 |

\* cited by examiner

*Primary Examiner* — Adolf D Berhane
*Assistant Examiner* — Afework S Demisse
(74) *Attorney, Agent, or Firm* — Burr & Forman LLP; Ryan M. Corbett

(57) ABSTRACT

A self-biased non-isolated buck regulator is provided. The regulator may include a first input terminal and a second input terminal, a high-voltage switch coupled to the first input terminal, a low-voltage switch coupled to the high-voltage switch, an inductor having a first terminal coupled to the high-voltage switch and the first low-voltage switch, a high-voltage rectifier diode coupled between the first low-voltage switch and the second input terminal, a second low-voltage switch coupled to the first low-voltage switch and the high-voltage rectifier diode, and a capacitor having a first terminal coupled to the first terminal of the inductor, and a second terminal coupled to the second low-voltage switch.

21 Claims, 5 Drawing Sheets

100 B1

SELF-BIASED NON-ISOLATED LOW-POWER SWITCHING REGULATOR

CROSS-REFERENCE TO RELATED APPLICATION

This application claims the benefit of U.S. Provisional Patent Application No. 62/858,113, filed on Jun. 6, 2019, which is incorporated by reference in its entirety.

BACKGROUND

The Internet of Things (IoT) is an umbrella term that covers many groups of related concepts, but in essence, these concepts share the following features: distributed intelligence, multiple interconnected sensors/actuators and decentralized control. In practice, IoT means that certain spaces, environments or objects can be made "smart" by incorporating sensors that can communicate to make them behave intelligently. All of this new technology needs power: highly efficient, low standby consumption AC/DC power supplies that can be used in a smart home or office with tens or hundreds of intelligent sensor nodes. In many cases, where there is no user access to the electrical parts is expected, these power supplies do not require safety isolation. In such cases, a sensor node can benefit from a low-cost non-isolated power supply solution.

A non-isolated flyback converter may be used to generate a low-power, low-voltage power supply. A separate auxiliary winding is used to generate a bias voltage powering the control circuitry of the converter itself. However, the cost of a multiple-winding flyback transformer puts it at a disadvantage compared to a single-inductor buck converter. A number of simple self-biased voltage regulators have been developed that use the buck converter topology and are capable of generating low output voltage from the universal AC line input.

FIG. 1 depicts a prior-art self-biased non-isolated buck regulator receiving input supply voltage $V_{IN}$ from an input source 101 and converting it to a low output voltage $V_O$ at a load 106. The regulator includes: a high-side high-voltage switch 102 receiving a gate drive signal G1, a high-voltage rectifier diode 103, an inductor 104, an output filter capacitor 105. The regulator additionally includes a bootstrap diode 107 and a flying capacitor 108 to derive bias voltage $V_{BOOT}$ for driving the switch 102.

The regulator of FIG. 1 suffers certain disadvantages. A high-voltage (~600V) ultra-fast diode is needed for the bootstrap diode 107, which affects the cost of the regulator. The minimum achievable output voltage is dictated by the gate voltage requirements of the switch 102. Therefore, the output voltage of 3.3V or 5V often required by the application may not be achievable with the regulator of FIG. 1. Yet another limitation is the short conduction time of the switch 102 dictated by the high step-down ratio $V_O/V_{IN}$, hence, the peak current in the switch 102 is difficult to control. The latter limitation affects the maximum achievable switching frequency of the regulator and, therefore, the size and cost of the inductor 104.

A self-biased prior-art regulator not having the above restriction for the output voltage and requiring no high-voltage bootstrap diode is shown in FIG. 2. The regulator additionally includes a low-voltage switch 109 receiving the gate drive signal G1. The high-voltage bootstrap diode 107 of FIG. 1 has been replaced with a low-voltage bootstrap diode 110.

FIG. 3 depicts voltage and current waveforms illustrating operation of the regulator of FIG. 2. The current IL in the inductor 104 is given by the waveform 201. The waveform 200 shows the current in the bootstrap diode 110. The gate drive signals G1 and G2 are represented by the waveforms 202 and 203, respectively. To supply the bootstrap voltage $V_{BOOT}$ at the capacitor 108, the trailing edge of G2 is delayed with respect to G1, maintaining the switch 102 in conduction while the switch 109 is off. Thus, the current IL finds its way through the diode 110, charging the capacitor 108 to a desired voltage level $V_{BOOT}$. Under this operating mode, the gate voltage of the switch 102 is exposed to a voltage level of approximately $2 \cdot V_{BOOT}$, which negatively affects the cost and the complexity of the control circuitry generating G2. The regulator of FIG. 2 still suffers the limitations related to the short conduction time of the switches 102 and 109 and the difficulty of controlling peak current in these switches.

Thus, a self-biased non-isolated regulator is needed that is capable of efficiently operating at high switching frequency from the universal AC line voltage and delivering a low output voltage not restricted to the required bootstrap voltage.

SUMMARY

According to an aspect of one or more exemplary embodiments, there is provided self-biased non-isolated buck regulator that may include a high-voltage switch, a low-voltage switch coupled to the high-voltage switch, an inductor having a first terminal coupled to the high-voltage switch and the low-voltage switch, a high-voltage rectifier diode coupled between the low-voltage switch and ground, a low-voltage diode having an anode and a cathode, wherein the anode is coupled to the low-voltage switch and the high-voltage rectifier diode, and a capacitor having a first terminal coupled to the first terminal of the inductor, and a second terminal coupled to the cathode of the low-voltage diode.

The high-voltage switch and the low-voltage switch may be field effect transistors (FETs), and the source terminal of the high-voltage source may be coupled to the source terminal of the low-voltage switch. The source terminals of the high-voltage switch and low-voltage switch may be coupled to the first terminal of the inductor. The drain terminal of the low-voltage switch may be coupled to the high-voltage rectifier diode and the anode of the low-voltage diode. The low-voltage switch may be configured to be deactivated to facilitate an alternate current path through the low-voltage diode. The regulator may also include a comparator configured to monitor a voltage drop across the low-voltage switch and thereby sense current in the low-voltage switch. The high-voltage switch may also be configured to be activated once current in the low-voltage switch has reached substantially zero.

According to one or more exemplary embodiments, the regulator may further include a current sense element configured to sense current in the low-voltage switch. The regulator may also include a first comparator configured to compare an output of the current sense element and a minimum threshold current, and a second comparator configured to compare a voltage at the low-voltage switch to a voltage at the capacitor. The regulator may also include a PWM latch coupled to the low-voltage switch, the first comparator, and the second comparator. The PWM latch may be configured to turn off the low-voltage switch based on an output of the first comparator indicating that the output of the current sense element is less than the minimum threshold current. The PWM latch may be configured to re-activate the low-voltage switch based on an output of the second comparator indicating that the voltage at the low-voltage switch is less than the voltage at the capacitor.

According to one or more exemplary embodiments, the regulator may include a comparator configured to monitor an output of the current sense element. The regulator may also include a PWM latch coupled to the comparator and the output of the high-voltage switch. The PWM latch is configured to turn on the high-voltage switch based on an output of the comparator indicating that the current in the low-voltage switch is substantially zero.

According to one or more exemplary embodiments, the regulator may also include a comparator configured to compare an output from the current sense element and a maximum threshold current. The regulator may also include a protection latch coupled to an output of the comparator, a delay timer having an input coupled to the output of the comparator and an output coupled to the protection latch. The protection latch may be configured to inhibit the gate drive signal from turning on the high-voltage switch based on an output of the comparator indicating that the current in the low-voltage switch is greater than the maximum threshold current. The protection latch may be configured to enable the gate drive signal to turn on the high-voltage switch based on an output of the delay timer.

According to an aspect of one or more exemplary embodiments, there is provided self-biased non-isolated buck regulator that may include an integrated circuit configured to receive an input voltage, a high-voltage rectifier diode coupled between the integrated circuit and ground, an inductor coupled to an output pin of the integrated circuit, and a capacitor having a first terminal coupled to the integrated circuit and a second terminal coupled to the inductor. The integrated circuit may include a high-voltage switch coupled to the input voltage, a low-voltage switch having a source terminal coupled to the high-voltage switch and the inductor, and a drain terminal coupled to the high-voltage rectifier diode, a low-voltage diode having an anode and a cathode, said anode coupled to the drain terminal of the low-voltage switch and the high-voltage rectifier diode, and said cathode coupled to the first terminal of the capacitor, and a current source coupled between the input voltage and the first terminal of the capacitor, said current source configured to initially charge the capacitor. The regulator may also include a resistor coupled to an input pin of the integrated circuit for sensing at least one of a peak voltage potential and an average voltage potential at the output pin of the integrated circuit.

DETAILED DESCRIPTION OF EXEMPLARY EMBODIMENTS

Figure 1:
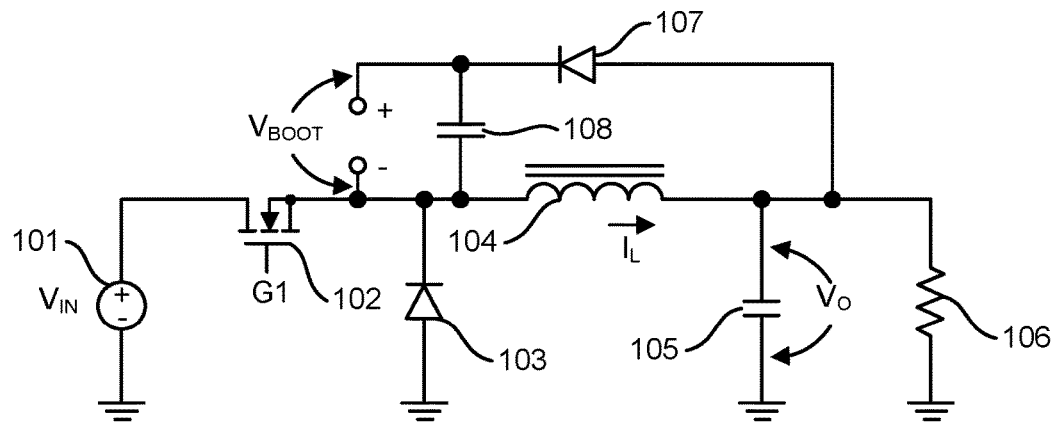
FIG. 1 illustrates a self-biased non-isolated buck regulator according to the prior art.
Figure 2:
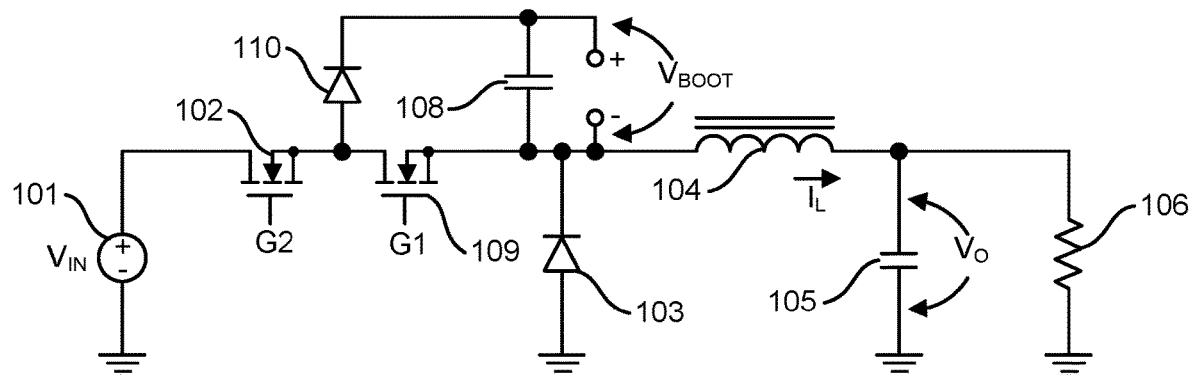
FIG. 2 illustrates another self-biased non-isolated buck regulator according to the prior art.
Figure 3:
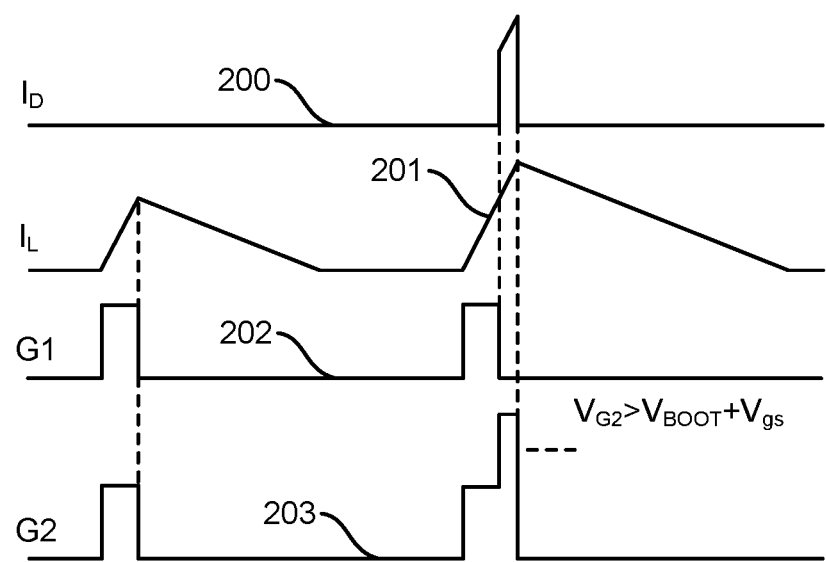
FIG. 3 illustrates voltage and current waveforms showing the operation of the regulator of FIG. 2.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 4:
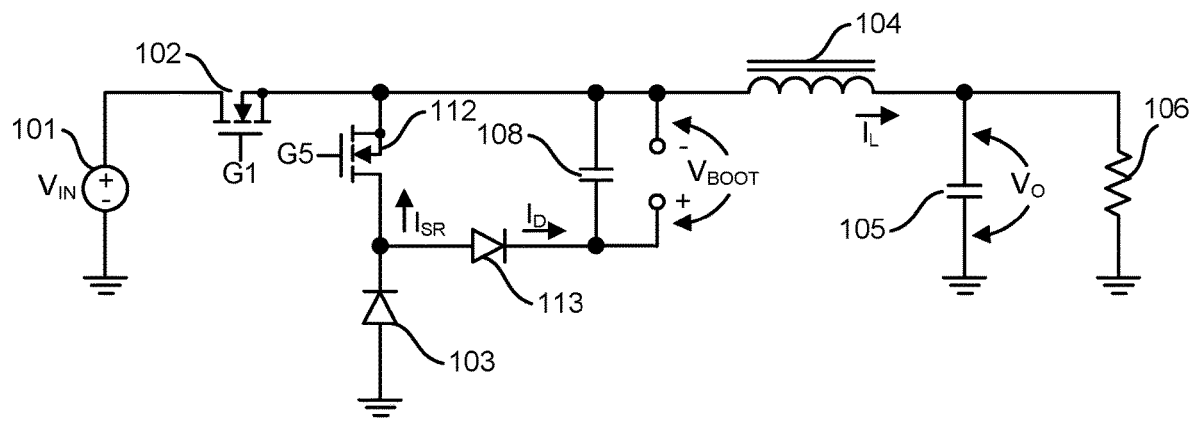
FIG. 4 illustrates a self-biased non-isolated buck regulator according to an exemplary embodiment.

FIG. 4 depicts a self-biased non-isolated buck regulator according to an exemplary embodiment, which receives an input supply voltage $V_{IN}$ from an input source 101 and converts it to a low output voltage $V_O$ at a load 106. The regulator may also include: a high-side high-voltage switch 102 receiving a gate drive signal G1, a high-voltage rectifier diode 103, an inductor 104, and an output filter capacitor 105. The regulator may additionally include a low-voltage switch 112 receiving a gate drive signal G5, a low-voltage diode 113 and a flying capacitor 108 to derive bias voltage $V_{BOOT}$ for driving the switches 102 and 112. Alternatively, the low-voltage diode 113 may be replaced with a low-voltage switch.

As shown in FIG. 4, the drain terminal of the high-voltage switch 102 is coupled to the input source 101, and the source terminal of the high-voltage switch 102 is coupled to the source terminal of the low-voltage switch 112. The source terminals of the high-voltage switch 102 and the low-voltage switch 112 are coupled to the inductor 104. The cathode of the high-voltage rectifier diode 103 is coupled to the anode of the low-voltage diode 113, which are both coupled to the drain terminal of the low-voltage switch 112. The anode of the high-voltage rectifier diode 103 is coupled to the return of the input source 101. The cathode of the low-voltage diode 113 is coupled to one terminal of the flying capacitor 108, and the other terminal of the flying capacitor 108 is coupled to the source terminals of the high-voltage switch 102 and the low-voltage switch 112, and the inductor 104. The output capacitor 105 is coupled to the output of the inductor 104, and in parallel with the load 106.

Figure 5:
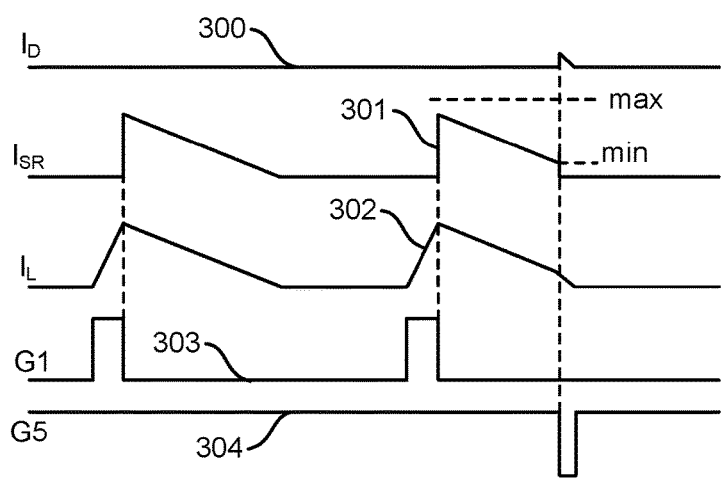
FIG. 5 illustrates exemplary voltage and current waveforms showing the operation of the exemplary regulator of FIG. 4.

FIG. 5 depicts voltage and current waveforms illustrating operation of the exemplary regulator of FIG. 4. The current IL in the inductor 104 is given by the waveform 302. The waveform 300 shows the current ID in the low-voltage diode 113. The current $I_{SR}$ in the low-voltage switch 112 is given by the waveform 301. The gate drive signals G1 and G5 are represented by the waveforms 303 and 304, respectively. The gate drive signal G5 turns the low-voltage switch 112 on continuously (or, at least, for the duration of conduction time of the rectifier diode 103) with brief interruptions near the end as required for supplying $V_{BOOT}$. During these interruptions in G5, the current IL is diverted into the capacitor 108 via the diode 113. Since, at that moment, the current in the inductor 104 is approaching zero, peak current stress of the low-voltage diode 113 may be reduced significantly.

Figure 6:
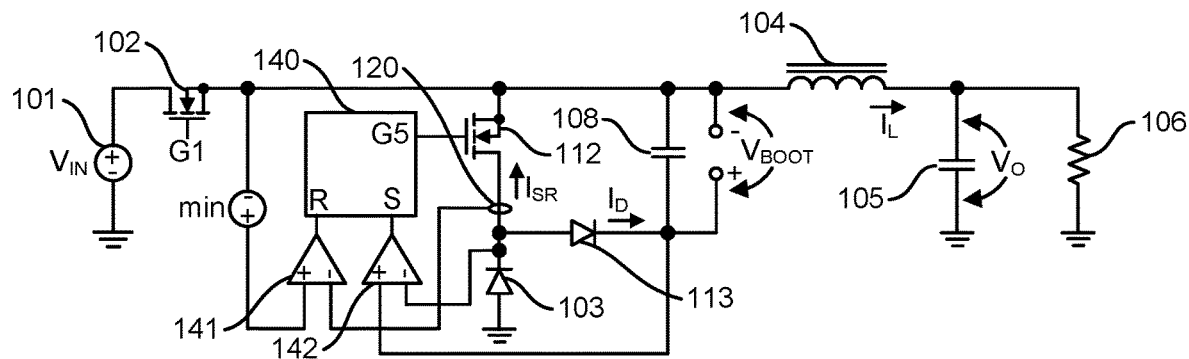
FIG. 6 illustrates a self-biased non-isolated buck regulator according to another exemplary embodiment.

FIG. 6 shows a regulator according to another exemplary embodiment, which may include a current sense element 120, a first comparator 141, a second comparator 142, and a PWM latch 140 for generating the gate drive signal G5. As shown in FIG. 6, the PWM latch 140 may include set (S) and reset (R) inputs, and may output gate drive signal G5 that drives low-voltage switch 112. The outputs of the first comparator 141 and the second comparator 142 are coupled to the R and S inputs of the PWM latch 140, respectively. The inverting terminal of the first comparator 141 receives the output of the current sense element 120, and the non-inverting terminal of the first comparator 141 receives a minimum threshold current 'min.' The inverting terminal of the second comparator 142 is coupled to the drain terminal of the low-voltage switch 112, and the non-inverting terminal of the second comparator 142 is coupled to the flying capacitor 108. In operation, the PWM latch 140 turns the low-voltage switch 112 off when the first comparator 141 detects the current $I_{SR}$ falling below a threshold 'min'. The PWM latch 140 re-activates the low-voltage switch 112 when the voltage at its drain terminal falls below $V_{BOOT}$, which is detected by the second comparator 142.

Figure 7:
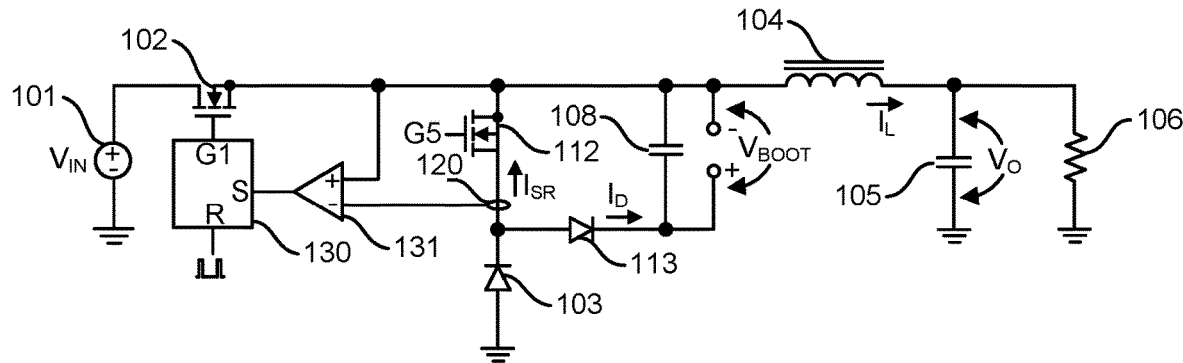
FIG. 7 illustrates a self-biased non-isolated buck regulator according to another exemplary embodiment that operates in a boundary conduction mode.

FIG. 7 shows a regulator according to another exemplary embodiment, which operates in boundary conduction mode (BCM) and may additionally include a current sense element 120, a comparator 131, and a PWM latch 130 for generating the gate drive signal G1. As shown in FIG. 7, the PWM latch 130 may include set (S) and reset (R) inputs, and may output a gate drive signal G1 that drives the high-voltage switch 102. The R input of the PWM latch 130 may be coupled to a periodic pulse signal, and the S input of the PWM latch 130 may be coupled to the output of comparator 131. The non-inverting terminal of the comparator 131 may be coupled to the source terminal of the high-voltage switch 102, and the inverting input of the comparator 131 may be coupled to the output of the current sense element 120. In operation, the PWM latch 130 turns the high-voltage switch 102 on when the comparator 131 detects the current $I_{SR}$ reaching substantially zero.

Figure 8:
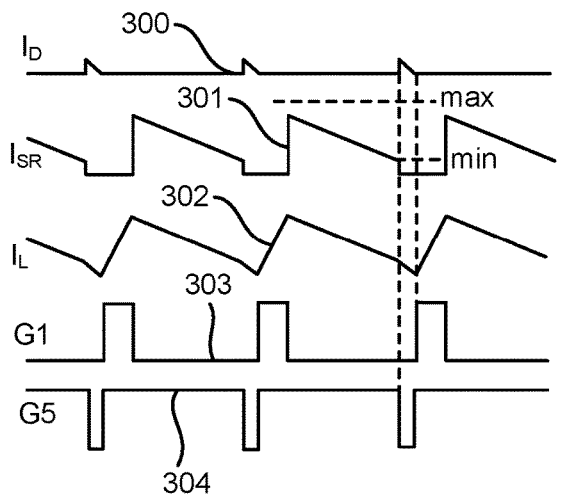
FIG. 8 illustrates exemplary voltage and current waveforms showing the operation of the exemplary regulator of FIG. 7.

FIG. 8 depicts voltage and current waveforms illustrating operation of the exemplary regulator of FIG. 7. The current IL in the inductor 104 is given by the waveform 302. The waveform 300 shows the current ID in the low-voltage diode 113. The current $I_{SR}$ in the low-voltage switch 112 is given by the waveform 301. The gate drive signals G1 and G5 are represented by the waveforms 303 and 304, respectively.

Figure 9:
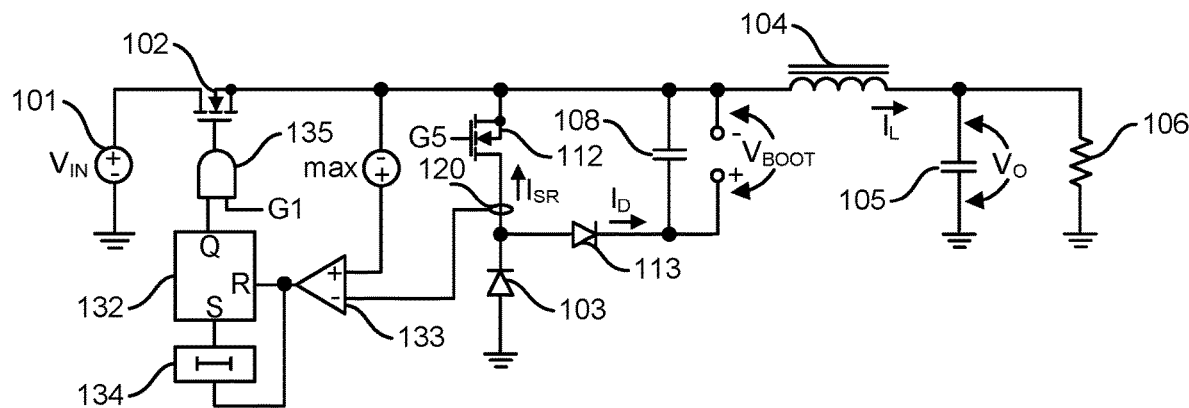
FIG. 9 illustrates a self-biased non-isolated buck regulator according to yet another exemplary embodiment.

FIG. 9 depicts a regulator according to yet another exemplary embodiment, which may additionally include a current sense element 120, a comparator 133, a delay timer 134, a protection latch 132, and a gate 135 for protecting the regulator from over current. The inverting input of the comparator 133 is coupled to the output of the current sense element 120, and the non-inverting input of the comparator 133 is coupled to a maximum threshold voltage. The output of the comparator 133 is coupled to the delay timer 134 and a reset (R) input of the protection latch 132. The output of the delay timer 134 is coupled to a set (S) input of the protection latch 132. The output of the protection latch 132 is coupled to one input terminal of gate 135. The other input terminal of gate 135 is coupled to the gate drive signal G1. The output of the gate 135 is coupled to the gate terminal of low-voltage switch 102. In operation, the protection latch 132 inhibits the gate drive signal G1 of the low-voltage switch 102 via the gate 135 when the comparator 133 detects the current sense 120 signal exceeding a threshold level 'max'. The protection latch 132 retries to enable the gate drive signal G1 after a delay time, which is based on the output of the delay timer 134.

Figure 10:
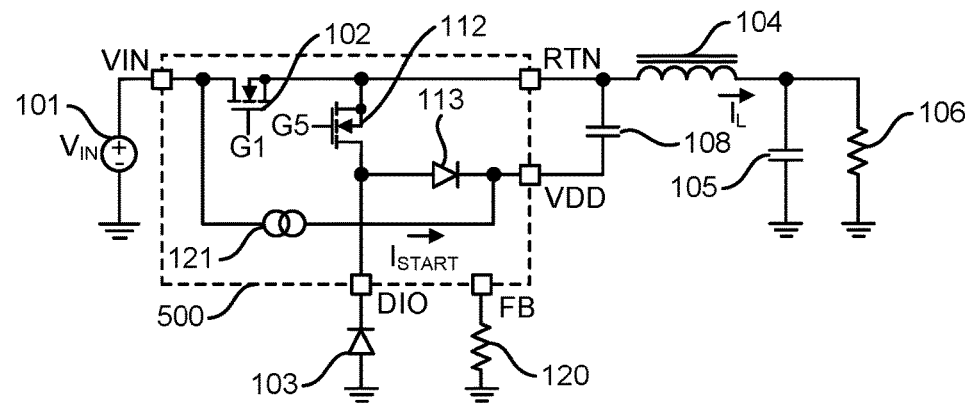
FIG. 10 illustrates a self-biased non-isolated buck regulator according to yet another exemplary embodiment.

FIG. 10 depicts a regulator according to yet another exemplary embodiment, which may include an integrated circuit (IC) 500 having an input pin $V_{IN}$ for receiving the input voltage $V_{IN}$ from input source 101, an output pin RTN for energizing the inductor 104, a VDD pin for supplying an internal bias voltage to generate the gate drive signals G1 and G5 for controlling the high-voltage and low-voltage switches 102 and 112, respectively, and a DIO pin for coupling high-voltage rectifier diode 103 to the low-voltage switch 112 and low-voltage diode 113. Alternatively, the low-voltage diode 113 may be replaced with a low-voltage switch. The IC 500 may additionally include a source of current 121 for initially charging the flying capacitor 108 with a current $I_{START}$. The IC 500 may also include an input pin FB for sensing the peak voltage potential and/or the average voltage potential at RTN via a resistor 120.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A regulator comprising:
a first input terminal and a second input terminal for receiving input voltage;
a high-voltage switch coupled to the first input terminal;
a first low-voltage switch coupled to the high-voltage switch;
an inductor having a first terminal coupled to the high-voltage switch and the first low-voltage switch;
a high-voltage rectifier diode coupled between the low-voltage switch and the second input terminal;
a second low-voltage switch coupled to the first low-voltage switch and the high-voltage rectifier diode; and
a capacitor having a first terminal coupled to the first terminal of the inductor, and a second terminal coupled to the second low-voltage switch.

2. The regulator of claim 1, wherein the second low-voltage switch is a low-voltage diode having an anode and a cathode, wherein the anode of the low-voltage diode is coupled to the first low-voltage switch, and wherein the cathode of the low-voltage diode is coupled to the second terminal of the capacitor.

3. The regulator of claim 1, wherein the high-voltage switch and first low-voltage switch are field effect transistors (FETs);
wherein a source terminal of the high-voltage switch is coupled to a source terminal of the first low-voltage switch; and
wherein the source terminals of the high-voltage switch and low-voltage switch are coupled to the first terminal of the inductor.

4. The regulator of claim 3, wherein a drain terminal of the first low-voltage switch is coupled to the high-voltage rectifier diode and the second low-voltage switch.

5. The regulator of claim 1 wherein the first low-voltage switch is configured to be deactivated to facilitate an alternate current path through the second low-voltage switch.

6. The regulator of claim 1 further comprising a current sense element configured to sense current in the first low-voltage switch.

7. The regulator of claim 1 further comprising a comparator configured to monitor a voltage drop across the first low-voltage switch and thereby sense current in the first low-voltage switch.

8. The regulator of claim 1 wherein the high-voltage switch is configured to be activated once current in the first low-voltage switch has reached substantially zero.

9. The regulator of claim 6 further comprising:
a first comparator configured to compare an output of the current sense element and a minimum threshold level.

10. The regulator of claim 1 further comprising:
a second comparator configured to compare a voltage at the first low-voltage switch to a voltage at the capacitor.

11. The regulator of claim 9 further comprising:
a PWM latch coupled to the first low-voltage switch and the first comparator,
wherein the PWM latch is configured to turn off the first low-voltage switch based on an output of the first comparator indicating that the output of the current sense element is less than the minimum threshold level.

12. The regulator of claim 10 further comprising: a PWM latch coupled to the first low-voltage switch and the second comparator wherein the PWM latch is configured to activate the low-voltage switch based on an output of the second comparator indicating that the voltage at the low-voltage switch is less than the voltage at the capacitor.

13. The regulator of claim 6, further comprising a comparator configured to compare an output of the current sense element and a substantially zero threshold level.

14. The regulator of claim 13, further comprising a PWM latch coupled to the comparator and the high-voltage switch;
wherein the PWM latch is configured to turn on the high-voltage switch based on an output of the comparator indicating that the current in the low-voltage switch is substantially zero.

15. The regulator of claim 6, further comprising a comparator configured to compare an output from the current sense element and a maximum threshold level.

16. The regulator of claim 15, further comprising:
a protection latch coupled to an output of the comparator;
wherein the protection latch is configured to inhibit a gate drive signal from turning on the high-voltage switch based on an output of the comparator indicating that the current in the output of the current sense element is greater than the maximum threshold level.

17. The regulator of claim 16, further comprising:
a delay timer having an input coupled to the output of the comparator and an output coupled to the protection latch;
wherein the protection latch is configured to enable the gate drive signal to turn on the high-voltage switch based on an output of the delay timer.

18. A regulator comprising:
a first input terminal and a second input terminal for receiving input voltage;
an integrated circuit coupled to the first input terminal;
a high-voltage rectifier diode coupled between the integrated circuit and the second input terminal;
an inductor coupled to an output pin of the integrated circuit; and
a capacitor having a first terminal coupled to the inductor and a second terminal coupled to the integrated circuit;
wherein said integrated circuit comprises:
a high-voltage switch coupled to the first input terminal;
a first low-voltage switch having a source terminal coupled to the high-voltage switch and the inductor, and a drain terminal coupled to the high-voltage rectifier diode; and
a second low-voltage switch coupled between the drain terminal of the first low-voltage switch and the second terminal of the capacitor.

19. The regulator of claim 18, wherein the second low-voltage switch is a low-voltage diode having an anode and a cathode, wherein the anode of the low-voltage diode is coupled to the first low-voltage switch, and wherein the cathode of the low-voltage diode is coupled to the second terminal of the capacitor.

20. The regulator of claim 18 further comprising a current source coupled between the first input terminal and the second terminal of the capacitor, said current source configured to initially charge the capacitor.

21. The regulator of claim 18 further comprising a resistor coupled to an input pin of the integrated circuit for sensing at least one of a peak voltage potential and an average voltage potential at the output pin of the integrated circuit.

* * * * *